United States Patent [19]
Johnson et al.

[11] Patent Number: 5,011,256
[45] Date of Patent: Apr. 30, 1991

[54] PACKAGE FOR AN OPTO-ELECTRONIC COMPONENT

[75] Inventors: Melvin H. Johnson, Chadds Ford; Leland L. Krauss, Aston; Dirk Landman, Lancaster, all of Pa.

[73] Assignee: E. I. du Pont de Nemours and Company, Wilmington, Del.

[21] Appl. No.: 263,188

[22] Filed: Oct. 28, 1988

[51] Int. Cl.$^5$ .............................. G02B 6/36
[52] U.S. Cl. .............................. 350/96.20; 350/96.15; 250/227.17; 357/80
[58] Field of Search ............... 350/96.15, 96.17, 96.20; 250/227, 552; 357/17, 19, 30, 74, 80

[56] References Cited

U.S. PATENT DOCUMENTS

| | | | |
|---|---|---|---|
| 4,119,363 | 10/1978 | Camlibel et al. | 350/96.20 |
| 4,192,574 | 3/1980 | Henry et al. | 350/96.17 |
| 4,399,541 | 8/1983 | Kovats et al. | 372/36 |
| 4,439,006 | 3/1984 | Stevenson | 350/96.20 |
| 4,503,452 | 3/1985 | Yokozawa et al. | 357/72 |
| 4,591,711 | 5/1986 | Taumberger | 250/227 |
| 4,687,290 | 8/1987 | Prussas | 350/96.20 |
| 4,708,429 | 11/1987 | Clark et al. | 350/96.20 |
| 4,714,315 | 12/1987 | Krause | 350/96.21 X |
| 4,722,586 | 2/1988 | Dodson et al. | 350/96.20 |
| 4,752,109 | 6/1988 | Gordon et al. | 350/96.20 |
| 4,865,410 | 9/1990 | Estrada et al. | 350/96.20 |

FOREIGN PATENT DOCUMENTS 2584827 1/1987 France .

OTHER PUBLICATIONS

Lytel 1300 nm Laser Module specification.
Hitachi Single Mode Fiber Laser Diode Module, LA 5272 and LA5273 specifications.
Fujitsu, Lightwave Semiconductors, Light-Emitting Diodes—Laser Diodes—Photodiodes.
Lasertron, Diode Laser Module, QLM1300SM, specification.
Mitsubishi Electronics, Optoelectronic Products, FU-43SLD-2, Preliminary.
Stantel Components, Laser Diode and Optical Receiver, Data Summary.
NEC Corporation, Active Devices, specification.

Primary Examiner—William L. Sikes
Assistant Examiner—Phan T. Heartney

[57] ABSTRACT

A package for an opto-electronic component and associated pigtail is characterized by a notch formed in the sidewall of an open topped lower housing portion which interrupts the edge of the housing such that the component can be laid into the housing with the pigtail extending through the notch.

34 Claims, 7 Drawing Sheets

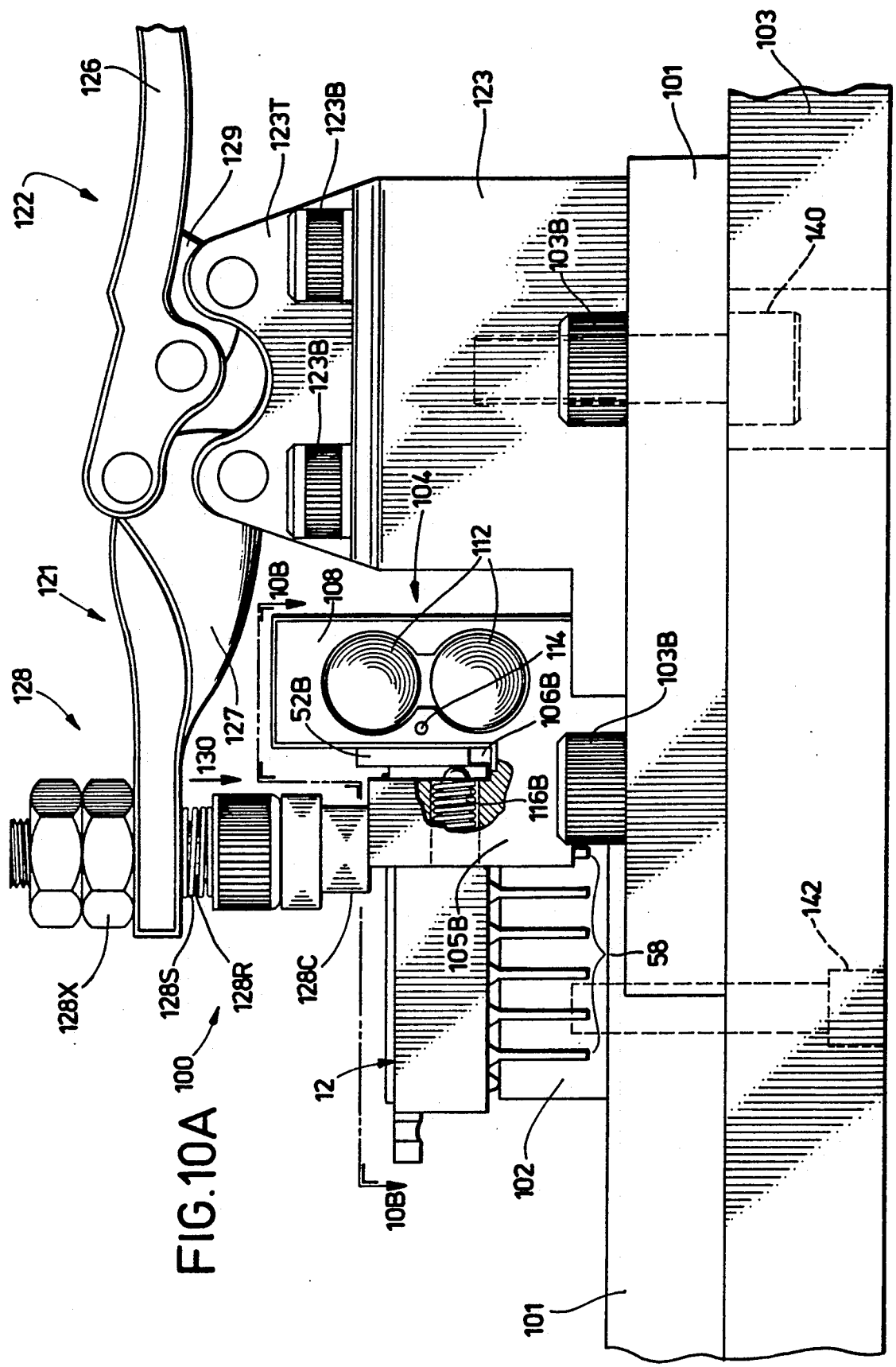

PACKAGE FOR AN OPTO-ELECTRONIC COMPONENT

BACKGROUND OF THE INVENTION

1. Field of the Invention

The present invention relates to a package for an opto-electronic component, and, in particular, to a package into which an opto-electronic component can be readily introduced.

2. Description of the Prior Art

Opto-electronic communications components, also referred to as "optical," "wave-optic" or "phontonic" components, are well-known. Such components typically include an active element, such as a solid state laser or photodiode, disposed within the interior chamber of an outer package structure. The wall of the package is provided with an aperture through which an optical fiber enters the chamber. The fiber extends through the aperture to place an end of the fiber into operative position with respect to the active element. Exemplary of components such as described above are those shown in U.S. Pat. No. 4,591,711 (Taumberger), U.S. Pat. No. 4,708,429 (Clark et al.), U.S. Pat. No. 4,687,290 (Prussas), U.S. Pat. No. 4,399,541 (Kovats et al.), U.S. Pat. No. 4,192,574 (Henry et al.), and U.S. Pat. No. 4,119,363, (Camlibel). U.S. Pat. No. 4,439,006 (Stevenson) discloses a connector in which the fiber passes through an aperture in a housing.

In the typical prior art arrangement the aperture through which the fiber passes is disposed at some location generally midway along one wall of the package. The aperture is thus completely surrounded by the material of the wall. As a result, at some point during manufacture of the component the fiber must be inserted through the aperture and into the chamber. Owing to the sizes of the fiber and the aperture, this is necessarily a difficult and labor intensive operation. Moreover, the passage of the fiber through the aperture is soldered, in order to insure hermeticity of the enclosure. This operation generally results in yield losses.

The problem of introducing the fiber into the package is exacerbated when the component takes the form of a "pig-tailed" subassembly, that is, one in which the fiber is attached to and trails from an enclosed, hermetically sealed module structure. In this event the free end of the pig-tail must be threaded through the aperture from the interior of the package. The pigtail is drawn through the aperture until the appropriate length of fiber remains within the package. The module is then secured within the housing.

Exemplary of a pig-tailed assembly is that shown in copending application Ser. No. 07/074,791, filed Jul. 17, 1987 which discloses and claims a fiber feedthrough arrangement having a compressive glass seal to seal the fiber within the outer tube of the feedthrough. Copending application Ser. No. 07/074,793 discloses and claims a fiber feedthrough assembly having a rigidizing arrangement therein. Copending application Ser. No. 07/147,830 discloses and claims a feedthrough assembly that has structure which decouples the feedthrough from stresses imposed by the mounting of the feedthrough to the package. Copending application Ser. No. 07/147,830 discloses and claims a component in which the end of the fiber is aligned, fixed and sealed with respect to the active element. Copending application Ser. No. 07/145,852 relates to a waveguide structure for a fiber optic device, while copending application Ser. No. 07/200,392 discloses and claims a transmitter element for a fiber optic communication system in which a monitor diode is mounted on a deflectable member.

In view of the foregoing it is believed advantageous to provide a package for an opto-electronic component that avoids the manufacturing disadvantages associated with the threading of a fiber or a fiber pigtail through an aperture in the wall of a package.

SUMMARY OF THE INVENTION

The present invention relates to a package for an opto-electronic component which avoids the necessity of threading a fiber or fiber pigtail through an aperture in a wall thereof. The package comprises a lower housing portion that includes a base and a cover. The sidewall has an edge thereon while the cover has an rim thereon which is engageable with the edge of the sidewall. The cover, when received on the sidewall, cooperates with the sidewall and the base to define a generally enclosed component receiving chamber. At least one of either the edge of the sidewall of the rim of the cover is interrupted by a gap therein, the chamber being accessible through the gap. The gap may be defined by a notch in the edge of the sidewall of the lower housing portion or an opening in the rim of the cover. In the peferred case, both the edge is interrupted by a notch and the cover is provided with the opening that registers with the notch to define an aperture through which the chamber is accessible. Because the notch in the sidewall of the package interrupts the edge thereof, before the cover is attached a component may be mounted within the chamber and the fiber may be laid in the notch to pass over the sidewall. Thus, the necessity of threading a fiber through the aperture in the sidewall is avoided.

In the preferred case the sidewall has an open cradle member mounted thereto in proximity to and in communication with the notch therein. The cover is provided with a canopy mounted to the cover in proximity to and in communication with the opening therein. The cradle on the sidewall and the canopy on the cover cooperate with each other when the cover is engaged with the base to define a tubular extension extending from the sidewall, the tubular extension being in communication with the chamber through the aperture defined by the registered opening and notch. The aperture through which the fiber enters the package is rendered dust tight by a tubular elastomeric sleeve that surrounds the fiber and the cooperating cradle and canopy.

BRIEF DESCRIPTION OF THE DRAWINGS

The invention will be more fully understood from the following detailed description thereof, taken in connection with the accompanying drawings, which form a part of this application and in which:

FIGS. 10A and 10B are, respectively, side elevational and plan views of a fixture useful to mount the component into the package.

DETAILED DESCRIPTION OF THE INVENTION

Figure 1:
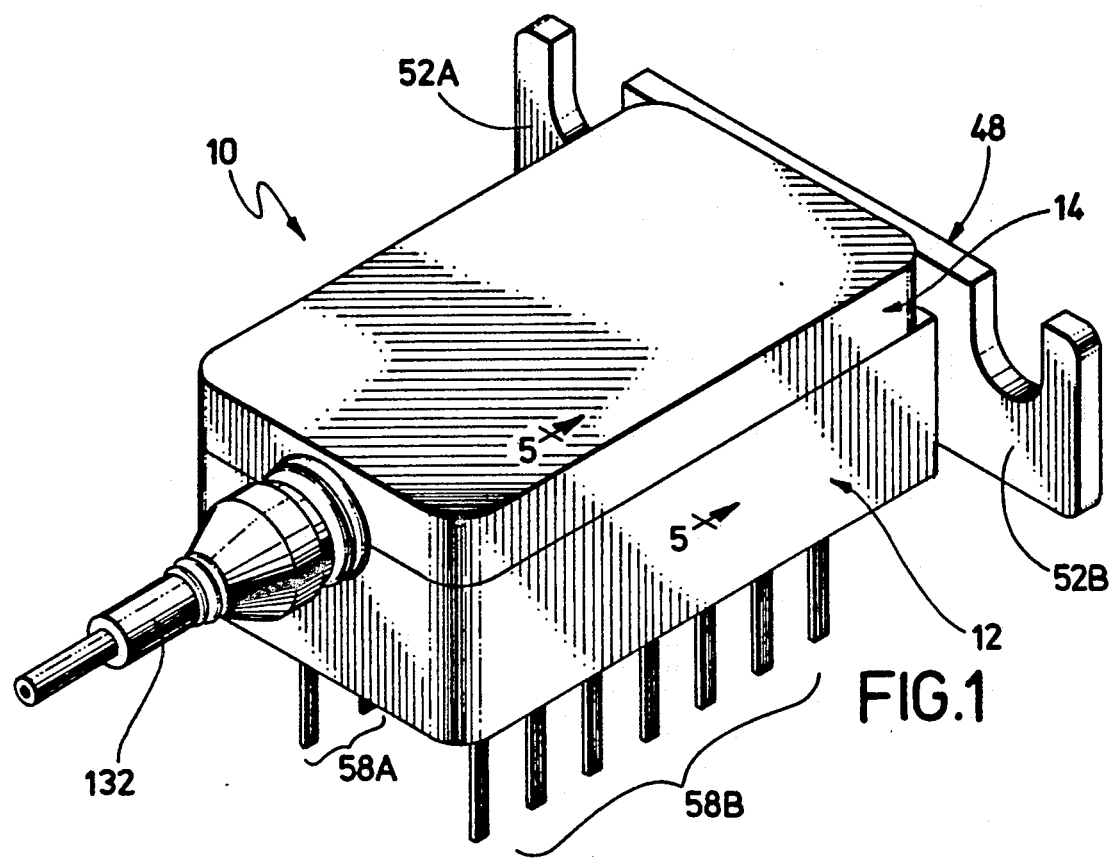
FIG. 1 is a perspective view of a completed opto-electronic component using a package in accordance with the present invention.

Throughout the following detailed description similar reference numerals refer to similar elements in all figures of the drawings.

Figure 2:
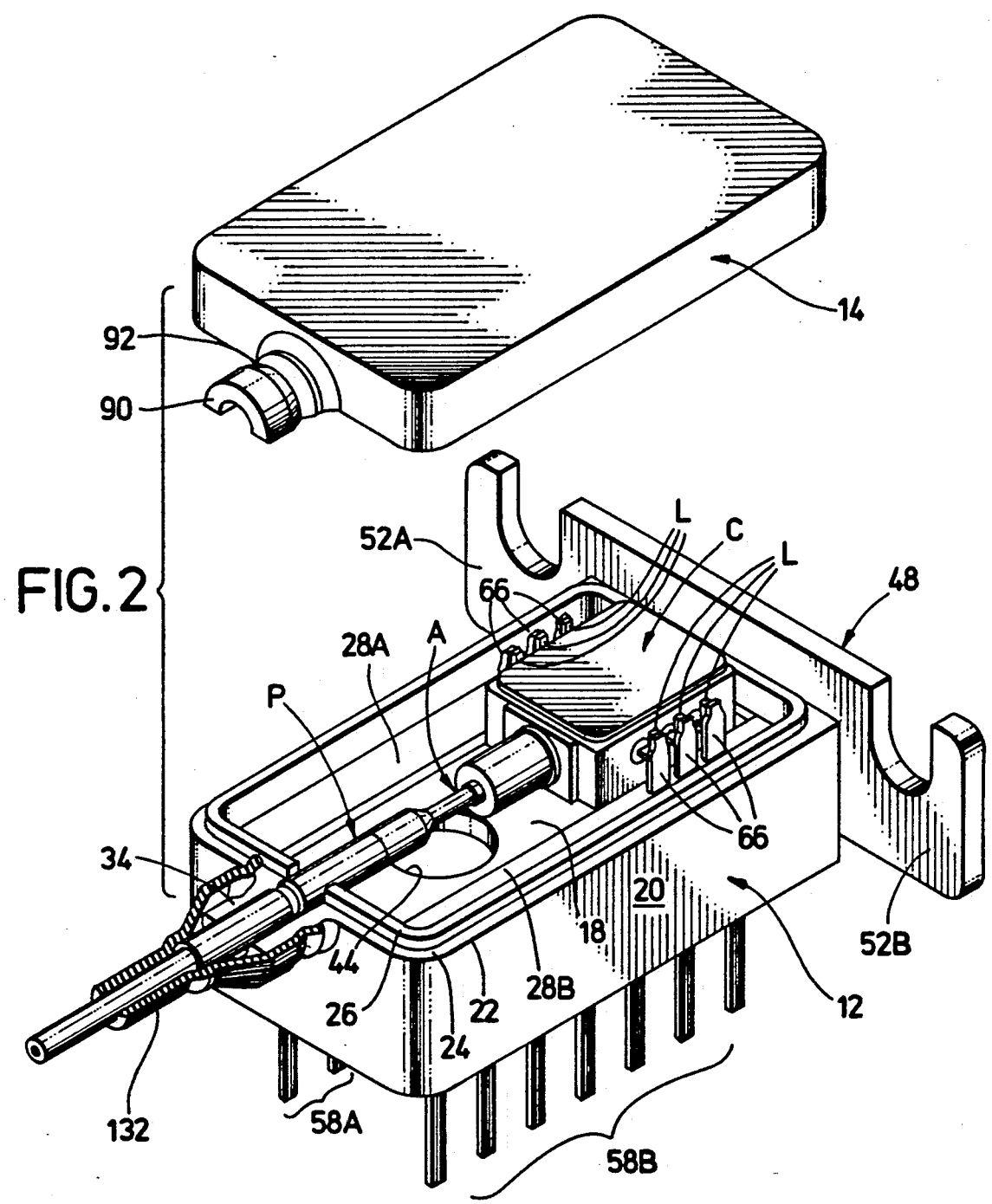
FIG. 2 is an exploded top perspective view of the completed opto-electronic component shown in FIG. 1.

With reference to the drawings, FIG. 1 illustrates a perspective view of an assembled package generally indicated by reference character 10 in accordance with the teachings of the present invention. The package 10 includes a lower housing portion 12 closed by a cover 14. The lower housing portion 12 is recessed on the interior thereof so that, when the cover 14 is engaged thereto, the lower housing portion 12 and the cover 14 cooperate to define an enclosed chamber within which is disposed an opto-electronic component C (FIG. 2). Preferably the component C is of the type having a hermetically sealed module from which trails an elongated optical fiber pigtail P. The component C has a plural arrays of paired leads L emanating therefrom. As seen from the end view of FIG. 9, a portion of each of the leads L is inclined upwardly, for a purpose to be described. The tip T of each lead L in each pair defines a predetermined span S therebetween. In the preferred instance the component C may include the teachings of any one of the copending applications listed earlier in this application. It should also be understood that the chamber may accept any alternately configured component, such as one in which an active element is mounted on a suitable pedestal within the chamber and a separate, disconnected, optical fiber is positioned within the chamber on a suitable mounting block provided therefor.

As seen in FIG. 2 the lower housing portion 12 has a generally planar base 18 from the periphery of which extends an upstanding sidewall 20. The upper edge 22 of the sidewall 20 defines a planar shelf 24 from which a lip 26 extends upwardly. The interior of the base 18 has a pair of abutments 28A and 28B (FIGS. 2 and 4) formed therein. The abutments 28A, 28B extend in parallel to each other along the length of the base 18. As is believed best seen in FIG. 5 the lip 26 has a bead 30 about the exterior upper surface thereof.

Figure 3:
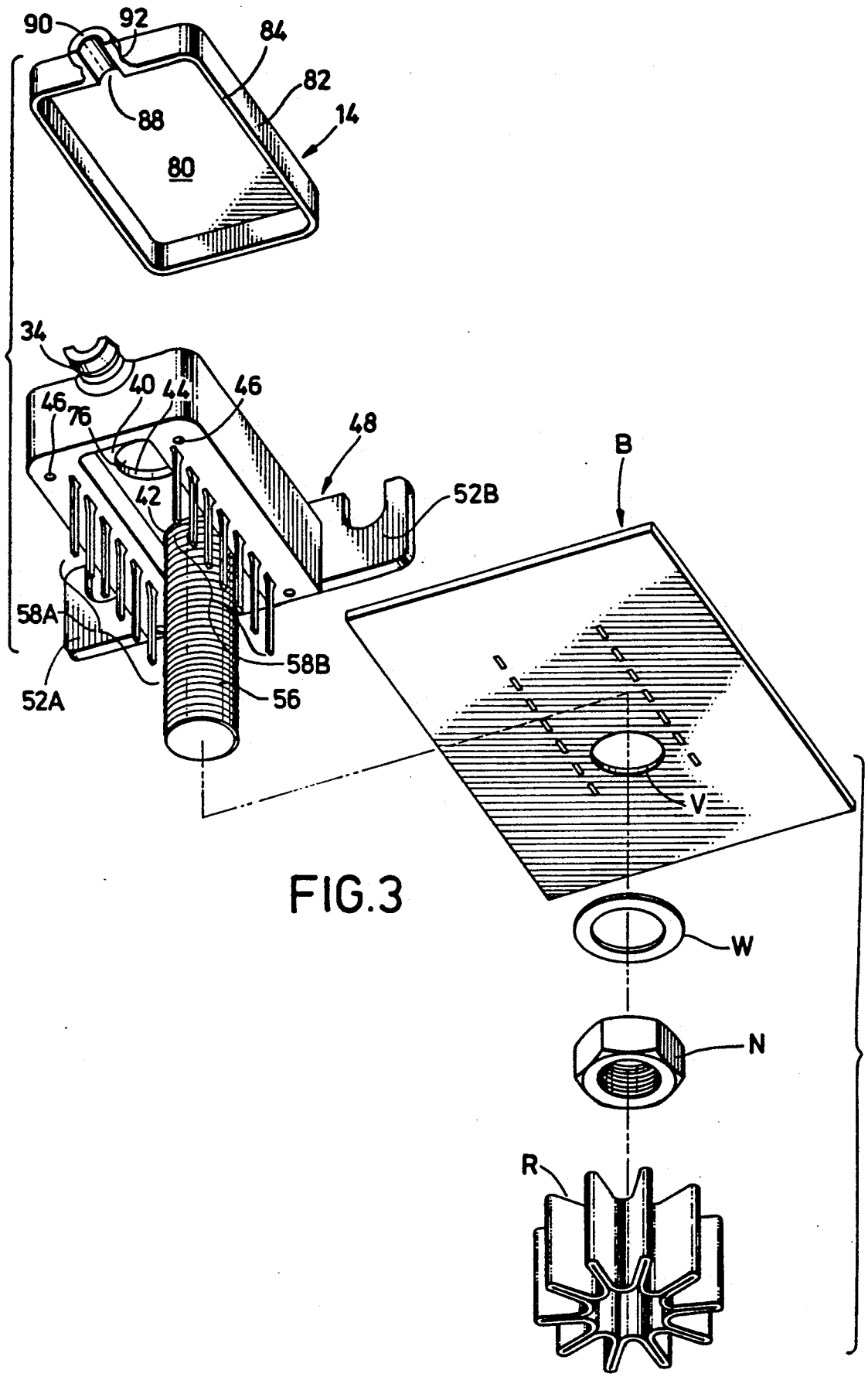
FIG. 3 is an exploded bottom perspective view of the package shown in FIG. 2 illustrating the package when mounted to a board.
Figure 4:
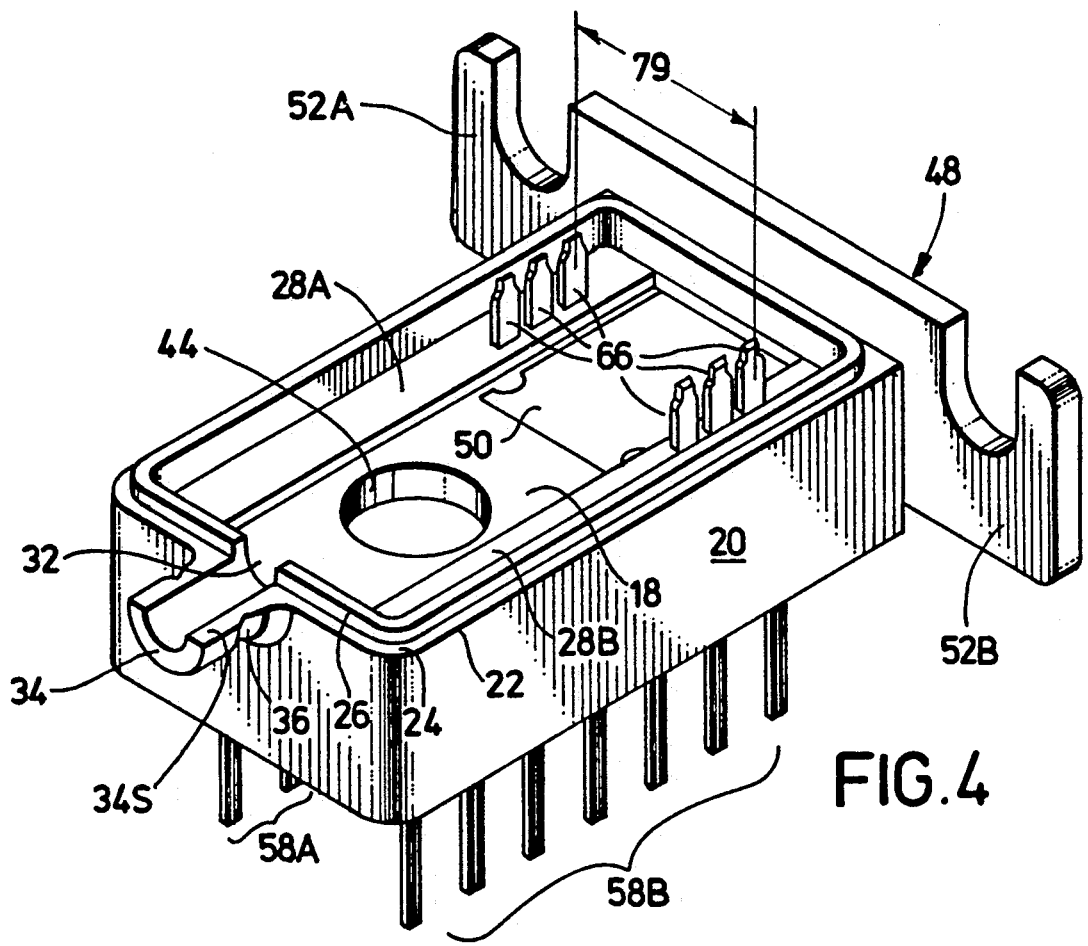
FIG. 4 is an isolated top perspective of the lower housing portion of the package showing a heat radiating member and electrical connection posts mounted therein.

The upper edge 22 (including the lip 26 thereon) at the top of the sidewall 20 of the lower housing portion 12 is, in the preferred case, interrupted by a notch 32 (best seen in FIG. 4). The notch 32 may take any convenient configuration, a generally cylindrical notch being illustrated in the drawings. A cradle member 34 is formed integrally with the sidewall 20 of the lower housing portion 12 and extends outwardly therefrom. The cradle 34 contains a generally cylindrical channel therein that is disposed in the vicinity of and in communication with the notch 32. The cradle 34 has a planar upper surface 34S that lies coplanar with the shelf 24. The cradle 34 has a circumferentially extending groove 36 provided on the exterior surface thereof provided for a purpose to be made clear herein. As is best seen in FIG. 3 the undersurface of the base 18 has a recess 40 therein. Standoffs 46 are integrally formed on the undersurface of the base portion 18.

Figure 7:
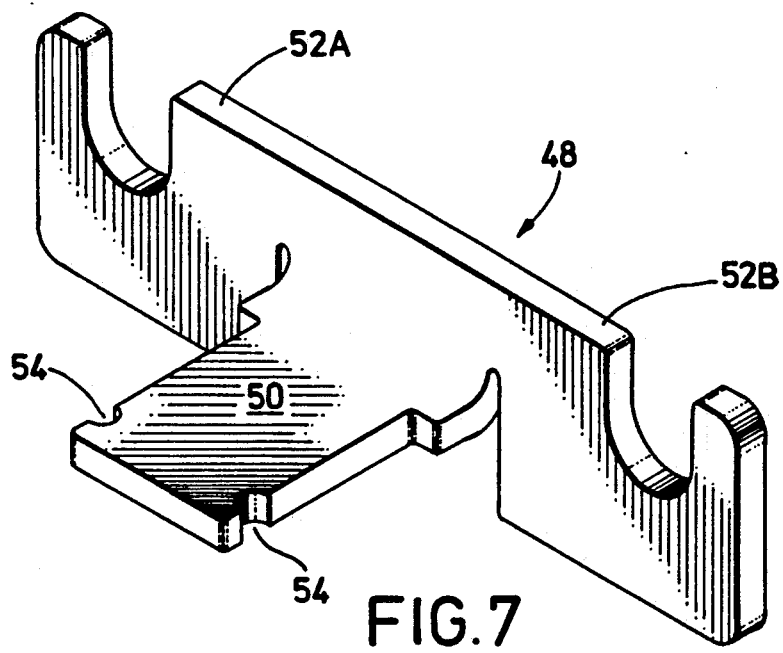
FIG. 7 is an isolated perspective view of a heat radiating member.

The lower housing portion 12 includes a heat conducting member 48. The heat conducting member 48 includes, in one embodiment thereof seen in isolation in FIG. 7, a planar shelf 50 and outwardly extending arms 52A and 52B. The planar shelf 50 is indented, as at 54. In the preferred instance the shelf 50 of the heat conducting member 48 defines a part of the base 18 of the lower portion 12. The member 48 is molded into the lower housing 12, with the indentations 54 grasping the material of the housing 12 to assist in securing the same thereto. The shelf 50 is exposed through an opening 42 to facilitate clamping the heat conducting mumber 48 during the molding process as will be described later. The upper surface of the planar shelf 50 is co-planer with the base 18. The component C is mounted to the upper surface of the shelf 50, preferably using an indium/tin solder, as will be discussed in connection with FIGS. 9 and 10. Heat generated by the component C is transferred to the heat conducting member 48 and radiated therefrom by the arms 54A, 54B. This arrangement of the heat conducting member 48 having the extending arms 52A, 52B thereon is useful when the package is mounted adjacent to the edge of a circuit board.

However, as shown in FIG. 3, an alternate arrangement of the heat conducting member 48 may be used which eliminates the extending arms. Since the undersurface of the planar shelf 50 of the heat conducting member 48 is accessible through the passage 42 in the base 18, a thermally conductive stud 56 extending through a via V in a board B may be disposed in thermal contact with the shelf 50, thus conducting heat from the component C to a vaned radiator R mounted to the undersurface of the board B. The mounting washer W and the mounting nut N are also shown. It is noted that the arms 52A, 52B are shown in FIG. 3, but could, of course, be eliminated if the alternate construction of the heat conducting member were used.

Figure 6:
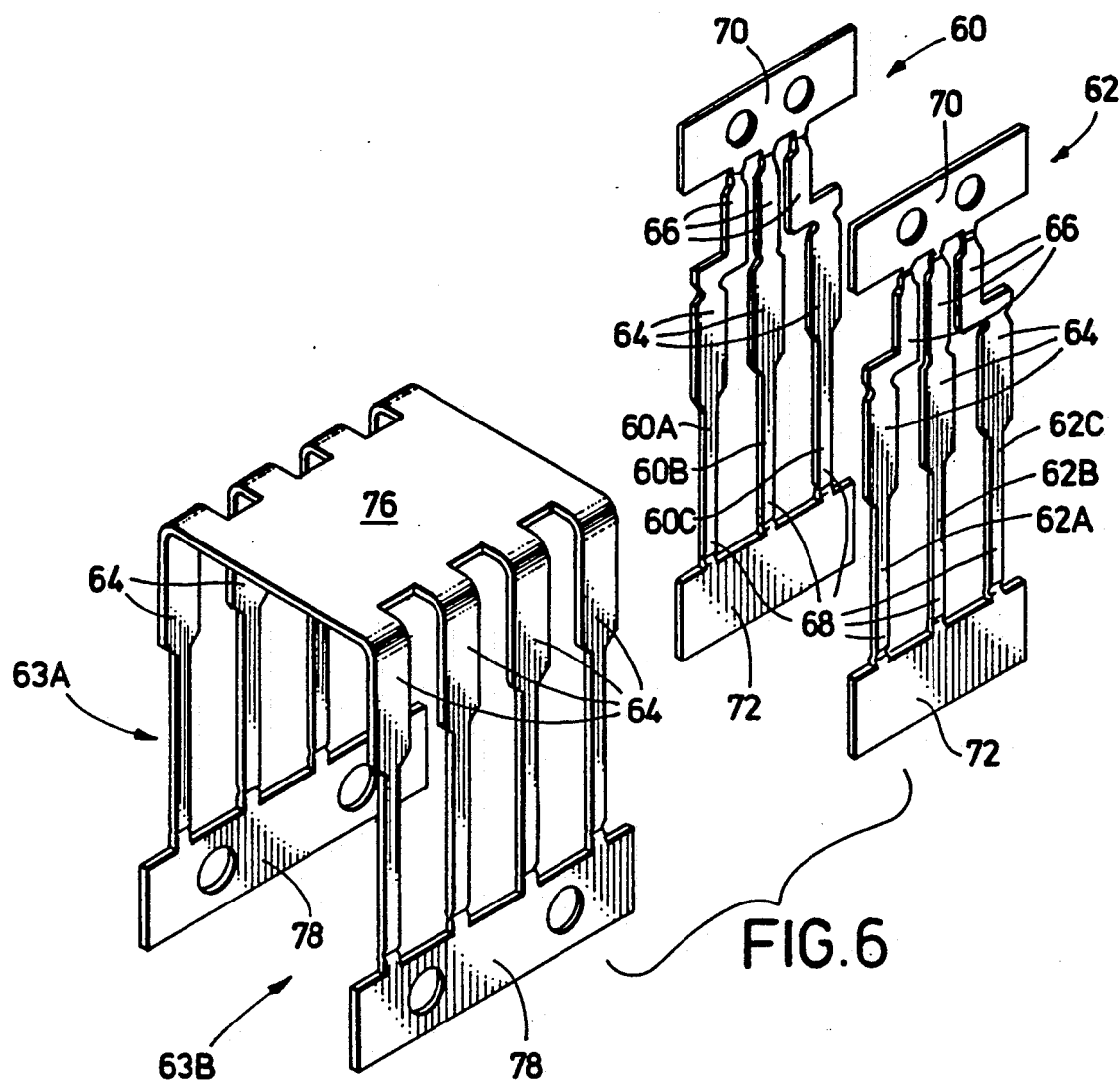
FIG. 6 is an isolated perspective view of the electrical connection posts with their lead frames still attached thereto.

The lower housing portion 12 includes dual-in-line arrays 58A, 58B of electrical connection posts. As seen in FIG. 6, the arrays 58A, 58B are defined by combinations of four sets 60, 62, 63A and 63B of connection posts that are integrally molded into the lower housing portion 12. In particular, the array of posts 58A is defined by the post sets 60 and 63A, while the array 58B is defined by the post sets 62 and 63B. The post sets 60 and 62 are identical and include a plurality of posts 60A, 60B, 60C and 62A, 62B and 62C, respectively. Each post includes a central body portion 64 from opposed ends of which upper tabs 66 and lower legs 68 extend. The tabs 66 are jogged with respect to the legs 68 to change the spacing between the tabs 66 from the spacing defined between the legs 68. Thus, for example, the typical 0.100 inch spacing between the legs may be converted to a spacing of 0.050 inch compatible for the leads L from the component C. To facilitate the insertion of the posts into the mold used to form the package during fabrication the tabs 66 and the legs 68 are joined together by lead frames or carrier strips 70, 72, respectively. The sets 63A, 63B of the posts are defined by bending the bodies 64 and associated legs 68 extending from a central planar web 76. The free ends of the legs 68 extending from the web 76 are joined by lead frames 78 for a similar reason. When assembled, the web 76 is incorporated into the base 18 and is visible through the passage 44 (FIG. 3). The planar web 76 connecting the connection posts 63A and 63B is clamped through a passage 44 in the base 18 to hold the connection posts in alignment during the molding process and as a result a portion of both the top and bottom of the planar web 76 is exposed through the passage 44.

Figure 5:
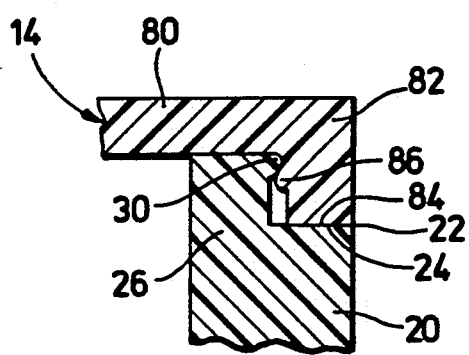
FIG. 5 is a side elevational view in section of the interconnected lower housing portion and cover of the package taken along section lines 5—5 of FIG. 1.

From FIG. 3 it may also be seen that the cover 14 has a generally planar central region 80 that is configured to match the periphery of the lower housing 12. The central region 80 has a downturned flange 82 the periphery of which defines a rim 84 thereon. As seen in FIG. 5 the inner surface of the flange 82 is provided with a bead 86 arranged to interconnect with the bead 30 provided on the lip 26 of the lower housing portion 12. The interconnectable beads 30 and 86 define means whereby the cover 14 and the lower housing portion 12 may be engaged one with the other. If desired, the engagement may be secured by a bead of epoxy, such as that manufactured and sold by Tra-Con Inc., Medford, Mass., as Tra-bond F113, to prevent the entry of dust into the chamber defined on the interior of the conjoined lower housing 12 and cover 14. Of course, any other suitable arrangement other than the interconnected beads (with or without the expoxy) may be used to secure the cover 14 to the lower housing portion 12.

As is believed best seen in FIG. 3 the rim 84 of the cover 14 is interrupted by an opening 88. Similar to the notch 32, the opening 88 is illustrated as generally cylindrical in configuration, although it need not be so limited. Projecting outwardly from the flange 82 of the cover 14 is a canopy 90. The canopy 90 has a channel therein that is generally cylindrical in configuration. A groove 92 is formed on the exterior surface of the canopy 90. The canopy 90 is disposed on the cover 14 in the vicinity of and in communication with the opening 88.

Figure 1A:
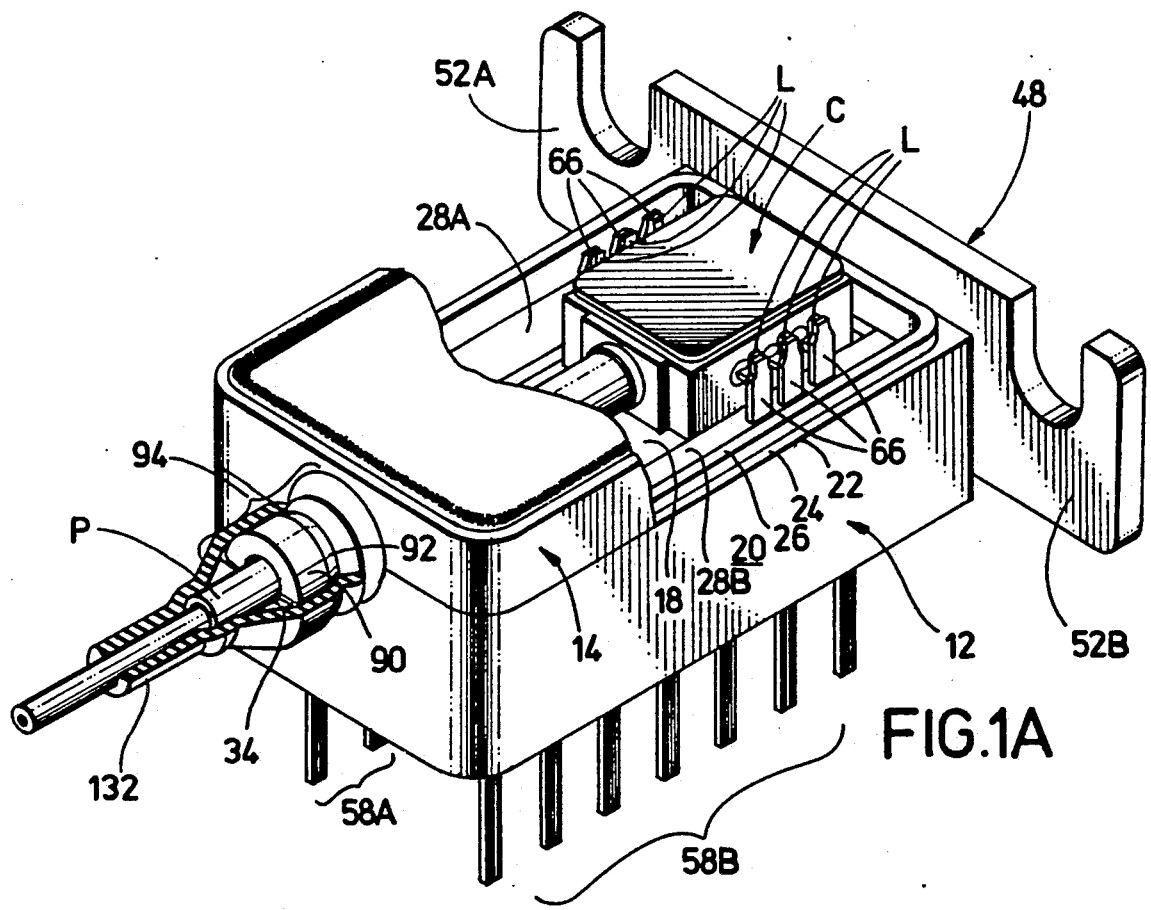
FIG. 1A is a view similar to FIG. 1 showing portions of the package broken away.

The canopy 90 and the opening 88 are arranged in the cover 14 so that, when the cover 14 is engaged to the lower housing portion 12, the canopy 90 and the opening 88 register respectively with the cradle 34 and with the notch 32. The registered cradle 34 and canopy 90 cooperate to define a tubular extension 94 (FIG. 1A) having a channel therethrough that projects from the sidewall of the package. Moreover, the registered notch 32 and opening 88 cooperate to define an aperture that communicates with the channel in the extension 94 so defined whereby access is afforded to the chamber on the interior of the package 10. The tubular extension is sized to prevent excessive bending of the pigtail P at its point of attachment A to the component C (FIG. 2). In practice, a clearance of about 0.015 inches between the pigtail P and the interior of the tubular extension 94 limits the bending of the pigtail P at the attachment point A.

The lower housing portion 12 is fabricated by an injection molding process from a thermoplastic material, for example, a glass reinforced polyester manufactured by General Electric Company as "Valox 400". To form the lower housing portion the heat conducting member 48 is placed into a mold. The post sets 60, 62 (with the lower lead frame strip 72 first removed) are each inserted into the mold. Once inserted, the top carrier strip 70 is removed. Similarly the carrier strips 78 are removed from the post sets 63A, 63B and the posts inserted into the mold until the web 76 is received therein. Once the sets 60, 62 and the web 76 are inserted into the mold, the metal parts are held in place by clamping between the upper and lower mold sections during molding. The cover 14 is preferably fabricated by injection molding using the same thermoplastic material.

From the foregoing it may now be readily appreciated that the structure of the package 10 in accordance with the present invention permits expeditious assembly of the component C and the pigtail P, in whatever configuration they may be presented. With the cover 14 removed the component C is attached to the shelf 50 of the radiating member 48, as will be discussed. When the cover 14 is removed, the notch 32 and the cradle 34 are presented to the assembler, so that the pigtail P need merely be laid through the notch 32 and into the cradle 34. The time consuming process of threading the pigtail P through the aperture in the wall of the package, as is required by the prior art, is eliminated using the package of the present invention. It is apparent from the discussion and the Figures that the dimension of the notch 32, the opening 88 (if provided), the cradle 34 and the canopy 90 presented to the assembler must be sufficient to accept the transverse dimension of the pigtail P.

Figure 9:
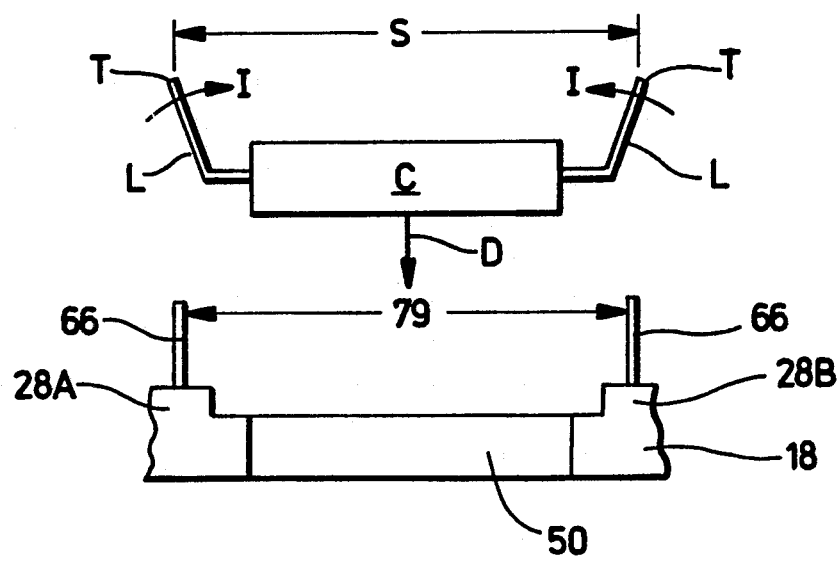
FIG. 9 illustrates a component having electrical leads thereon in accordance with the present invention.
Figure 10B:
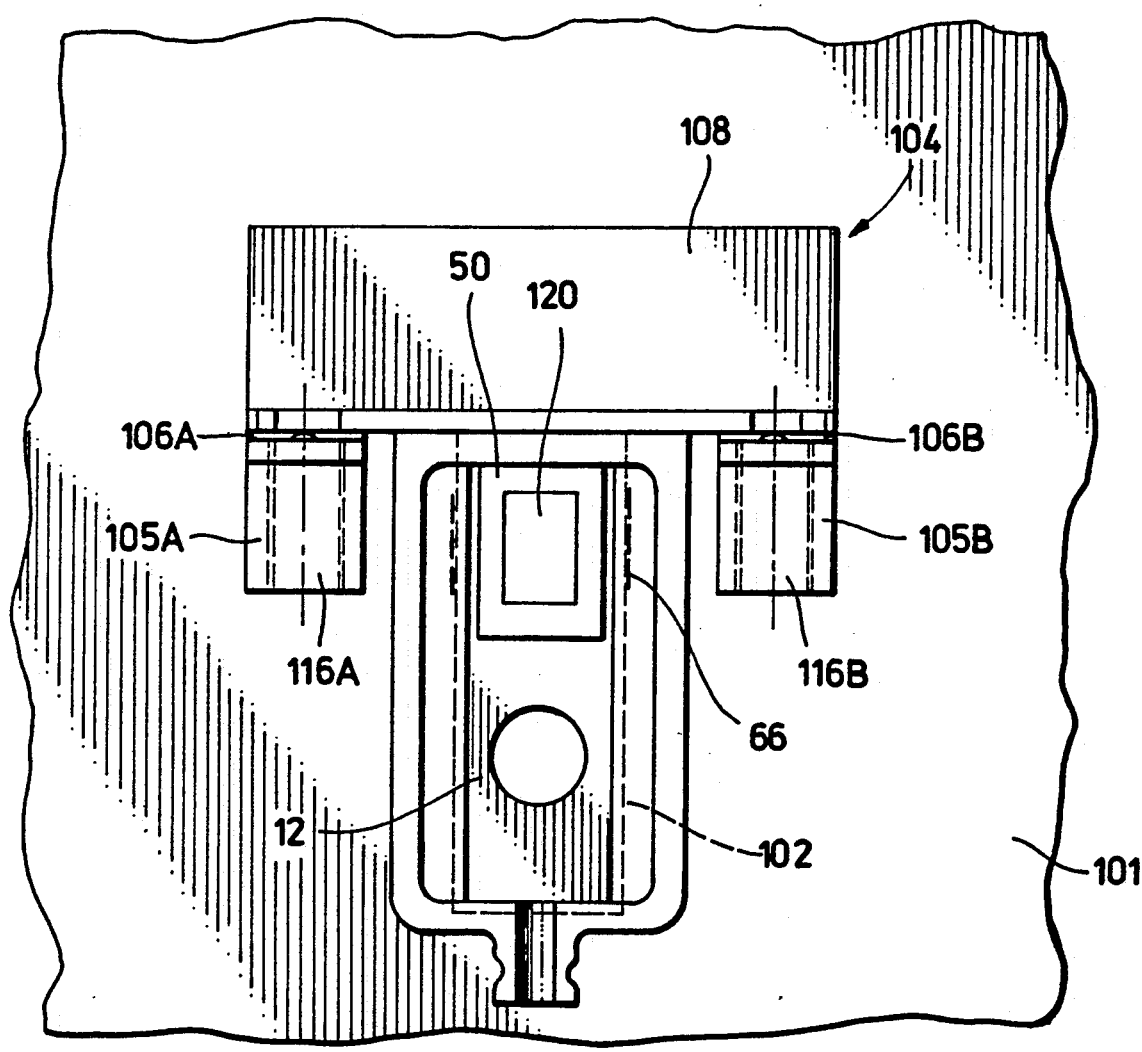

FIGS. 9, 10A and 10B more particularly describe the sequence whereby the component C may be attached to the shelf 50 within the package. As best seen in FIG. 9, after the lower housing 12 is molded the tabs 66 of the post sets 60 and 62 project upwardly through the abutments 28A, 28B, respectively. The span S between the tips T of the leads L of the component C is greater than the predetermined clearance distance 79 by which the tips of the tabs 66 are separated.

In the following discussion it is assumed that the radiating member 48 having the extending arms 52A, 52B is used. The installation of the component C is accomplished using a soldering fixture 100 shown in FIGS. 10A and 10B. The fixture 100 includes a ceramic mounting platform 102 mounted to an insulating base 101. The base in mounted to a block 103 by bolts 103B. The platform 102 may be manufactured from the machinable ceramic such as that sold by Corning Glass, Corning, N.Y., under the trademark MACOR ®. The base 101 is preferably formed from an SP polyimide resin material such as that manufactured and sold by E. I. Du Pont de Nemours and Company, Incorporated, under the trademark VESPEL ® parts and shapes. Spaced past the forward end of the platform 102 is a heater block 104. The block 104 includes two pillars 105A, 105B that are spaced slightly from the lateral surfaces of the platform 102. Each pillar 105A, 105B is slotted, as at 106A, 106B, respectively, to separate the main portion 108 of the block 104 from the pillars 105A, 105B. The main portion 108 of the block 104 contains heater cartridges 112, visible in FIG. 10A. A temperature monitoring thermocouple 114 is mounted in the block 104. Each of the pillars 105A, 105B contains a spring loaded plunger assembly 116A, 116B. Suitable for use as the plungers 116 are the ball plunger devices manufactured by Vlier Engineering, Burbank, California, and sold under model number X2-N.

The lower housing 12 is laid onto the platform 102 with the arrays of the electrical connection posts 58 straddling the platform 102. The arms 52A, 52B of the radiating member 48 are introduced into the solts 106A, 106B of the pillars 105A, 105B of the heater block 104. The slots 106A, 106B are sized such that the lower edge of the member 48 is spaced above the bottom of the slots. The spring loaded plungers 116A, 116B, which are provided with rounded ends so as to retract during the insertion of the arms 52 into the slots 106, are asserted to urge the arms 52A, 52B into thermal contact with the main portion 108 of the block 104. A low temperature (118 degrees Centigrade) indium/tin solder paste or preform 120 (FIGS. 9 and 10B) is placed on the planar shelf 50 of the housing 12. Solder flux could be added to either the bottom of the component C or the preform 120.

The component C is then inserted into the package. As is best seen in FIG. 9, the leads L from the component C are inclined upwardly and outwardly. Thus, as the component C is inserted in the direction D through the open top of the lower housing 12 onto the shelf 50 incorporated in the base 18 thereof, the tabs 66 act to urge the leads L inwardly (in the direction of the arrows I) causing a wipping action to occur between the leads L and the tabs 66. The resiliency of the leads L cause the same to spring back toward the tabs 66 to form a snug connection therebetween.

A suitable biasing arrangement generally indicated at 121 is disposed to impose a biasing force on the component C as the solder pad 120 melts. In the preferred instance the biasing arrangement 121 includes a toggle clamp arrangement 122 (FIG. 10A) such as that manufactured by De-Sta-Co Division of Dover Corporation, Troy, Mich., under model number 205-S. The clamp 122 includes a trunnion 123T that is mounted to a block 123 (as by bolts 123B), the block being located in a convenient position adjacent to the heater block 104. The clamp 122 is a four bar linkage arrangement that includes a clamp arm 126, a downwardly extending finger arm 127, the trunnion 123T and a bar 129.

The finger arm 127 has a finger 128 on the end thereof. As seen in the drawing FIG. 10A arm 127 is twisted approximately ninety degrees between its end that is attached to the trunnion 123T and to the clamp arm 126 and its end attached to the finger 128. The finger 128 is formed, in one embodiment, from a rod 128R that extends through an opening at the end of the arm 127. The rod 128R has a stop 128X at its upper end and a a ceramic cap 128C at the lower end thereof. A spring 128S acts against the cap 128C and the undersurface of the arm 127 to bias the cap 128C downwardly yet permits the cap 128C to float with respect to the component C to align itself thereto. By spring loading the finger 128 the cap 128C can accommodate itself to the component C, thus avoiding damage to the component C. This is especially important if, as is preferred, the component C is a hermetically sealed module. Of course, the biasing arrangement may take the form of a cylinder/plunger arrangement having a biasing fluid therein and remain within the contemplation of the invention. The block 103, the block 123 and the base 101 are secured together by a bolt 140. The platform 102, the base 101 and the block 103 are secured together by a bolt 142.

The arm 126 is operated, causing the finger 128 to move in the direction 130 and bringing the lower surface thereof against the component C to apply pressure thereto and to press the same toward the shelf 50. The heaters 112 are actuated and the temperature monitored by the thermocouple 114. A visual inspection is made until the solder preform 120 melts at which time the heaters 112 are turned off. The assembly is cooled to below 50 degrees Centigrade and the clamp 122 opened. The tabs 66 and the leads L are thereafter soldered using an indium/tin solder. Since in the preferred instance the pigtail P trails from the component C, the cradle 34 serves to align the pigtail P with respect to the component C. Of course, if the component does not have a trailing pigtail, a separate pigtail may then be laid into the cradle and appropriately secured in the housing.

In the event the embodiment of the heat radiating member without arms is used, the fixture is modified to apply the heat needed to melt the solder preform 120 through a conducting stud, similar in form to the stud 56 shown in connection with FIG. 3. It should also be appreciated that although a manual assembly arrangement is described, it lies within the contemplation of the present invention to utilize a robot or automated mounting arrangement. The structure of the package in accordance with this invention is believed to be particularly advantageous in this regard, since the component C and pigtail P (whether or not attached to the component) is able to be laid into housing from the open top thereof. Such an operation is able to be efficiently performed using a robotic arm.

Once the pigtail P is laid in the notch 32 in the sidewall 20, the cover 14 may be affixed to the lower housing 12. The snapping engagement of the beads 30 and 86 (FIG. 5) holds the parts together in the assembled relationship shown in FIG. 5. The sealing epoxy above discussed may be applied to insure the seal.

As seen in FIGS. 1 and 2, in order to further protect against the entry of dust into the chamber, an elastomeric boot 132 may then slid from the free end of the pigtail P to overlie a portion of the registered cradle 34 and canopy 90 and the portion of the pigtail P adjacent thereto. The inner end of the boot 132 is received in the registered grooves 36 and 92. The provision of the elastomeric boot 132 also permits displacement of the pigtail P along its axis, thus providing a stress relief able to accommodate relative thermally induced movements of the pigtail with respect to the package.

Figure 8:
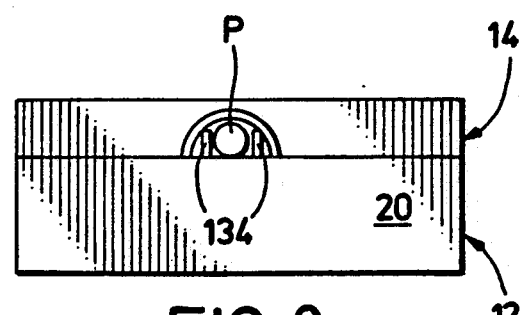
FIG. 8 illustrates a front elevational view of an alternate embodiment of a package in accordance with the present invention.

It should be appreciated that the foregoing preferred embodiment of the package may be modified and remain in the contemplation of the present invention. For example, it should be appreciated that the cradle and the canopy may be omitted if desired so that the pigtail extends from the chamber on the interior of the package through the aperture defined by the registered notch and opening. Moreover, it may be advantageous in some instances to provide only a notch 32 in the sidewall 20 and merely lay the pigtail P therethrough, without providing a cooperating opening in the cover 14. Alternately, an opening 88 may be provided only in the cover 14, with the pigtail P being laid over the rim 26 of the sidewall 20 of the lower housing 12, so that when the cover 14 is engaged to the lower housing 12 the pigtail P is received in and accommodated by the opening 88 in the cover. This arrangement is illustrated in FIG. 8. In this instance it may be desired to outfit the sidewall 20 with suitable positioning pegs 134. The pegs 134 may be used to locate the pigtail P as it passes over the sidewall 20 so that the pigtail P (and the positioning pegs 134) may be received within the opening 88 in the cover 14.

Those skilled in the art, having the benefit of the teachings of the present invention as set forth above may effect numerous modifications thereto. It should be understood that such modifications are to be construed as lying within the contemplation of the present invention, as defined by the appended claims.

What is claimed:

1. A package for an opto-electric component comprising:
   a base;
   a sidewall on the base, the sidewall having an upper edge thereon;
   a cover having a rim thereon, the rim of the cover being engageable with the upper edge of the sidewall,
   the cover, when received on the sidewall, cooperating with the sidewall and the base to define a generally enclosed chamber,
   at least one of either the edge of the sidewall or the rim of the cover being interrupted by a gap therein, the chamber being accesible through the gap.

2. The package of claim 1 wherein the edge of the sidewalls is interrupted by a notch, the notch defining the gap through which the chamber is accesible.

3. The package of claim 1 wherein the rim of the cover is interruped by an opening, the opening defining the gap through which the chamber is accesible.

4. The package of claim 2 further comprising a open cradle member mounted to the sidewall in proximity to and in communication with the notch therein.

5. The package of claim 4 further comprising a heat conducting member having a planar shelf thereon, the heat conducting member being mounted to the package, a portion of the base of the package being defined by the planar shelf of the heat conducting member.

6. The package of claim 3 further comprising a heat conducting member having a planar shelf thereon, the heat conducting member being mounted to the package, a portion of the base of the package being defined by the planar shelf of the heat conducting member.

7. The package of claim 6 further comprising a passage in the base, the passage in the base exposing a portion of the shelf of the heat conducting member.

8. The package of claim 5 further comprising a passage in the base, the passage in the base exposing a portion of the shelf of the heat conducting member.

9. The package of claim 8 further comprising means for securing the cover to the base.

10. The package of claim 5 further comprising means for securing the cover to the base.

11. The package of claim 4 further comprising means for securing the cover to the base.

12. The package of claim 3 further comprising means for securing the cover to the base.

13. The package of claim 2 further comprising means for securing the cover to the base.

14. The package of claim 13 wherein the securing means comprises a bead mounted on each of the cover and the sidewall of the base, the beads being interengaged when the cover is received on the sidewall.

15. The package of claim 12 wherein the securing means comprises a bead mounted on each of the cover and the sidewall of the base, the beads being interengaged when the cover is received on the sidewall.

16. The package of claim 11 wherein the securing means comprises a bead mounted on each of the cover and the sidewall of the base, the beads being interengaged when the cover is received on the sidewall.

17. The package of claim 10 wherein the securing means comprises a bead mounted on each of the cover and the sidewall of the base, the beads being interengaged when the cover is received on the sidewall.

18. The package of claim 9 wherein the securing means comprises a bead mounted on each of the cover and the sidewall of the base, the beads being interengaged when the cover is received on the sidewall.

19. The package of claim 6 wherein the base has a passage therein, further comprising: a heat conducting stud extending through the passage in the base into thermal contact with the shelf of the thermal conducing member.

20. The package of claim 5 wherein the base has a passage therein, further comprising: a heat conducting stud extending through the passage in the base into thermal contact with the shelf of the thermal conducing member.

21. A package for an opto-electronic component comprising:
   a base;
   a sidewall on the base, the sidewall having an upper edge thereon, the edge being interrupted by a notch formed in the sidewall; and
   a cover having a rim thereon, the rim of the cover being engageable with the upper edge of the sidewall, the rim of the cover being interrupted by an opening that registers with the notch in the edge of the sidewall,
   the cover, when received on the sidewall, cooperating with the sidewall and the base to define a generally enclosed component receiving chamber, the notch in the sidewall and the opening in the cover cooperating to define an access aperture, the chamber being accessible through the access aperture.

22. The package of claim 21 further comprising:
   an open cradle member mounted to the sidewall in proximity to and in communication with the notch therein; and
   a cradle canopy mounted to the coverr in proximity to and in communication with the opening therein;
   the cradle and the canopy cooperating with each other when the cover is mounted to the sidewall to define a tubular extension extending from the sidewall, the tubular extension being in communication with the chamber through the aperture defined by the registered opening and notch.

23. The package of claim 22 further comprising an elastomeric boot connected to the tubular extension.

24. The package of claim 22 further comprising a heat conductive member mounted to the housing, the heat conducting member having a planar portion thereon, a portion of the base of the package being defined by the planar portion of the heat conducing member.

25. The package of claim 24 wherein the base has a passage therein, further comprising: a heat conducting stud extending through the passage in the base into thermal contact with the shelf of the thermal conducting member.

26. The package of claim 24 further comprising means for securing the cover to the base.

27. The package of claim 26 wherein the securing means comprises a bead mounted on each of the cover and the sidewall of the base, the beads being interengaged when the cover is received on the sidewall.

28. The package of claim 21 further comprising a heat conducting member mounted to the housing, the heat conducting member having a planar portion thereon, a portion of the base of the package being defined by the planar portion of the heat conducting member.

29. The package of claim 28 wherein the base has a passage therein, further comprising: a heat conducting stud extending through the passage in the base into thermal contact with the shelf of the thermal conducting member.

30. The package of claim 28 further comprising means for securing the cover to the base.

31. The package of claim 30 wherein the securing means comprises a bead mounted on each of the cover and the sidewall of the base, the beads being interengaged when the cover is received on the sidewall.

32. An opto-electronic apparatus comprising:
- a package having a base surrounded by a sidewall, the base and sidewall cooperating to define an open topped housing a first and second conductive tab extending upwardly from the base, the tabs having tips thereon, the tips of the tabs being spaced apart by a first predetermined distance;
- an opto-electronic component having a first and a second electrical lead emanating therefrom, each of the leads having an upwardly inclined portion, the leads each having a tip thereon, the tips of the leads being spaced apart by a predetermined span, the span being greater than the predetermined distance between the tips of tabs such that as the component is inserted onto the base intermediate the inclined portion of the leads wipe against the tabs and are bent from their inclined orientation by the tabs.

33. A package for an opto-electric component comprising:
- a base;
- a sidewall on the base, the sidewall having an upper edge theron, the edge being interrupted by a notch formed in the sidewall, an open cradle member mounted to the sidewall in proximity to and in communication with the notch therein;
- a cover having a rim thereon, the rim of the cover being engageable with the upper edge of the sidewall, the rim of the cover being interrupted by an opening that registers with the notch in the edge of the sidewall, a cradle canopy mounted to the cover in proximity to and in communication with the opening therein;
- a heat conducting member having a planar portion thereon a portion of the base of the package being defined by the planar portion of the heat conducting member;
- means for securing the cover to the base, the securing means comprising a bead mounted on each of the cover and the sidewall of the base, the beads being interengaged when the cover is received on the sidewall;
- the cover, when received on the sidewall, cooperating with the sidewall and the base to define a generally enclosed component receiving chamber, the notch in the sidewall and the opening in the cover cooperating to define an access aperture, the chamber being accessible through the access aperture,
- the cradle and the canopy cooperating with each other when the cover is mounted to the sidewall to define a tubular extension extending from the sidewall, the tubular extension being in communication with the chamber through the apertured defined by the registered opening and notch; and
- an elastomeric boot connected to the tubular extension.

34. A method for manufacturing an opto-electronic apparatus comprising the steps of:
(a) inserting an opto-electronic component onto the base of an open-topped package, the base having a sidewall thereon the sidewall having an upper edge that is interrupted by a notch formed therein;
(b) securing the component to the base;
(c) laying a fiber across the sidewall so that that fiber lies in the notch therein; and,
(d) attaching a cover to the sidewall such that the cover, when received on the sidewall, cooperates with the sidewall and the base to define a generally enclosed chamber having the component therein.

* * * * *

Disclaimer 5,011,256—*Melvin H. Johnson*, Chadds Ford; *Leland L. Krauss*, Aston; *Dirk Landman*, Lancaster, all of Pa. PACKAGE FOR AN OPTOELECTRONIC COMPONENT. Patent dated April 30, 1991. Disclaimer filed Aug. 9, 1991, by the assignee, E. I. du Pont de Nemours and Co.

Hereby enters this disclaimer to the remaining term of said patent.